(12) United States Patent
Hori et al.

(10) Patent No.: US 8,178,072 B2
(45) Date of Patent: May 15, 2012

(54) METHOD OF MANUFACTURING ALKALI METAL TITANATE

(75) Inventors: Naomichi Hori, Chigasaki (JP); Nobuo Kamishima, Chigasaki (JP)

(73) Assignee: Toho Titanium Co., Ltd., Kanagawa (JP)

( * ) Notice: Subject to any disclaimer, the term of this patent is extended or adjusted under 35 U.S.C. 154(b) by 79 days.

(21) Appl. No.: 12/681,975

(22) PCT Filed: Oct. 14, 2008

(86) PCT No.: PCT/JP2008/068922
§ 371 (c)(1),
(2), (4) Date: Apr. 7, 2010

(87) PCT Pub. No.: WO2009/051249
PCT Pub. Date: Apr. 23, 2009

(65) Prior Publication Data
US 2010/0209333 A1    Aug. 19, 2010

(30) Foreign Application Priority Data

Oct. 15, 2007   (JP) .................................. 2007-267543

(51) Int. Cl.
*C01G 23/00* (2006.01)
*C01D 1/02* (2006.01)
(52) U.S. Cl. ................... 423/598; 423/594.15
(58) Field of Classification Search .................. 423/598, 423/594.15
See application file for complete search history.

(56) References Cited

U.S. PATENT DOCUMENTS

| 5,407,754 | A  | * | 4/1995  | Harada et al. ................. 428/614 |
| 6,268,307 | B1 | * | 7/2001  | DeFilippi et al. ............. 502/427 |
| 7,713,504 | B2 | * | 5/2010  | Sabacky et al. ............... 423/263 |
| 7,901,659 | B2 | * | 3/2011  | Itoi .......................... 423/594.15 |
| 2003/0017104 | A1 | * | 1/2003  | Spitler et al. ................ 423/598 |
| 2004/0253173 | A1 | * | 12/2004 | Ogawa et al. ................ 423/598 |
| 2008/0249222 | A1 | * | 10/2008 | Itoi ............................. 524/413 |

FOREIGN PATENT DOCUMENTS

| JP | 62256799   | 11/1987 |
| JP | 02083300   | 3/1990  |
| JP | 02164722   | 6/1990  |
| JP | 03279215   | 12/1991 |
| JP | 04136220   | 5/1992  |
| JP | 08049119 A | 2/1996  |

(Continued)

OTHER PUBLICATIONS

PCT International Preliminary Report on Patentability and Written Opinion of the International Searching Authority, PCT/JP2008/068922, May 20, 2010.

*Primary Examiner* — Stanley Silverman
*Assistant Examiner* — Anthony J Zimmer
(74) *Attorney, Agent, or Firm* — Quarles & Brady LLP

(57) ABSTRACT

The present invention provides a method of manufacturing an alkali metal titanate, the method including at least a first step of mixing a titanium compound and an alkali metal compound to prepare a first mixture and sintering the first mixture, and a second step of adding the alkali metal compound to the sintered body, which is formed at the first step, to prepare a second mixture and sintering the second mixture. The present invention provides the alkali metal titanate having a desired composition and a single-phase.

13 Claims, 1 Drawing Sheet

FOREIGN PATENT DOCUMENTS

| | | |
|---|---|---|
| JP | 08209455 | 8/1996 |
| JP | 09087929 A | 3/1997 |
| JP | 10139431 A | 5/1998 |
| JP | 10316428 A | 12/1998 |
| JP | 2000103619 A | 4/2000 |
| JP | 2001253712 A | 9/2001 |
| JP | 2001294424 A | 10/2001 |
| JP | 2008056563 | 3/2008 |

* cited by examiner

US 8,178,072 B2

METHOD OF MANUFACTURING ALKALI METAL TITANATE

CROSS REFERENCE TO RELATED APPLICATIONS

This application represents the national stage application of International Application PCT/JP2008/068922 filed 14 Oct. 2008, which claims priority of Japanese Patent Application 2007-267543 filed 15 Oct. 2007, which is incorporated herein by reference in its entirety for all purposes.

TECHNICAL FIELD

The present invention relates to a method of manufacturing alkali metal titanate, and especially to a method of manufacturing a single-phase thereof.

RELATED ART

Alkali metal titanate includes lithium titanate, sodium titanate, and potassium titanate as useful material. The lithium titanate is used for electrode material ($Li_4Ti_5O_{12}$) of secondary battery, the sodium titanate is used for ark-stabilizer (JP 2001-294424 A), reinforcing agent for friction modifier or resin (JP H08-049119), and the potassium titanate is used for reinforcing agent for friction modifier or resin.

The alkali metal titanate is manufactured with a wet process or a solid phase method. The solid phase method has an advantage about cost. When the solid phase method is utilized, a titanium compound and an alkali metal compound are mixed together and the mixture is heat treated to obtain the alkali metal titanate. The solid phase method, however, produces the alkali metal titanate containing a variety of ratios of alkali metal/titanium and causes difficulty to obtain the single-phase alkali metal titanate due to evaporation loss of the alkali metal during the heat treatment. It is difficult to control shape of the alkali metal titanate required for application and safety thereof.

A melt process for controlling the shape of the single-phase alkali metal titanate is disclosed in JP H09-87929A. The melt process includes the steps of melting a mixture of powders of $TiO_2$ and $K_2O$ and cooling the molten mixture to obtain a block of fibers of potassium dititanate, converting the block of fibers into fibers of a hydrated potassium titanate, which contains 15-20 percent of K, with a primary de-potassium treatment, pre-drying the hydrated fibers at 100-400 degrees C., eluting the potassium by at most 13.6 percent of K with a secondary de-potassium treatment, and heat treating the eluted material at 900-1300 degrees C. to change a crystal structure. This method adjusts an amount of liquid and intensity of stirring in the primary and the secondary de-potassium treatment to obtain the fibers a diameter of about 20-50 μm and a length of 100-400 μm. Control of the elution of potassium in the secondary de-potassium treatment provides polycrystalline fibers with the single-phase potassium hexa-titanate (JP H09-87929 A). This method includes the additional de-potassium treatment causing the process complicated.

JP2001-253712 A discloses other method. The method includes the steps of acid-treating potassium magnesium titanate or potassium lithium titanate, seeking the resultant plate shaped titanic acid into a solution of potassium hydroxide, intercalating the potassium ion, and sintering the intercalated material. The method provides the plate shaped potassium tetra-titanate or potassium hexa-titanate having an average major axis of 1-100 microns and an average aspect ratio of 3-500. This method requires the intercalation treatment of potassium ion, resulting in the complicated process.

JP H10-316428 A discloses another method of manufacturing potassium titanate whisker with sintering of titanium dioxide and potassium oxide. The potassium titanate whisker includes alkali metal halide and metal oxide. The sintering temperature is set a range of temperature lower than the conventional temperature (about 1100 degrees C.). This method provides a single-phase fine whisker having a small average length and diameter (JP H10-316428). However, this method uses halide as the raw material and requires a protection of corrosion to the furnace.

Patent Documents

Document 1: JP 2001-294424 A
Document 2: JP H08-049119 A
Document 3: JP H09-87929 A
Document 4: JP 2001-253712 A
Document 5: JP H10-316428 A

DISCLOSURE OF THE INVENTION

An object of the present invention is to provide a method of easily manufacturing an alkali metal titanate particle with a solid phase method, the alkali metal titanate particle having a single-phase and a controlled shape without de-potassium treatment or intercalate treatment.

According to a first object of the present invention, the method includes at least a first step of mixing a titanium compound and an alkali metal compound to prepare a first mixture and sintering the first mixture; and a second step of adding the alkali metal compound to the sintered body, which is formed at the first step, to prepare a second mixture and sintering the second mixture.

Preferably, an amount of the alkali metal compound to be added at the second step is adjusted in response to a composition ratio (by weight or mole) of the desired alkali metal titanate to other compound such as titanium oxide (titanium dioxide) formed at the first step in order to obtain a single-phase alkali metal titanate with sintering at the second step. When the sintered body formed at the first step contains the alkali metal titanate and the titanium oxide, the method includes a first procedure for determining a relation between a composition ratio of the alkali metal titanate to the titanium oxide and an peak intensity ratio of the strongest interference line of X-ray diffraction of the alkali metal titanate to the titanium oxide; a second procedure for determining the peak intensity ratio of the strongest interference lines of X-ray diffraction of the alkali metal titanate to the titanium oxide formed at the first step; a third procedure for determining the composition ratio of the alkali metal titanate to the titanium oxide formed at the first step by applying the intensity ratio determined at the second procedure to the relation determined at the first procedure, wherein the amount of the alkali metal titanate to be added at the second step is adjusted with the composition ratio determined at the third procedure in order to convert the residual titanium oxide after the first step to the desired alkali metal titanate. The present invention including two steps provides the method of easily manufacturing the single-phase alkali metal titanate with high temperature sintering by solving a problem of evaporation loss of the alkali metal.

When the alkali metal compound is a potassium compound, it is preferable that the sintering temperature of the first step is higher than the sintering temperature of the second step. Preferably, the sintering temperature of the first step is 1000-1300 degrees C. and the sintering temperature of the second step is 800-1000 degrees C. The first step improves formation of the alkali metal titanate and provides the desired shape and size thereof. The second step keeps the shape of the alkali metal titanate formed at the first step and controls evaporation loss of the alkali metal. The second step causes a reaction between the residual titanium compound at the first step and the alkali metal titanate added at the second step to form the alkali metal titanate having the desired composition. The formed potassium titanate has a rod, a columnar, a cylindrical, a rectangular and/or a plate shape. The size thereof increases as the sintering temperature at the first step increases. The embodiment of the present invention provides potassium hexa-titanate useful for friction material.

According to a second object of the present invention, the method includes at least a first step of mixing a titanium compound and an alkali metal compound to prepare a first mixture and sintering the first mixture; and a second step of adding the alkali metal compound to the sintered body, which is formed at the first step, to prepare a second mixture, dispersing the second mixture in a solvent to form a slurry, spray-drying the slurry to form a powder, and sintering the powder. The first step forms the alkali metal titanate particles having the desired shape. The second step forms the particles each having a hollow body shape configured with the alkali metal titanate while keeping the shape of the particles at the first step. When the slurry is formed at the second step, the alkali metal compound is added similar to the above embodiment. The sintering at the second step then forms the hollow body particles configured with the alkali metal titanate particles having the desired composition. The hollow body powder is useful for the friction material and increases wear resistance.

BEST MODE FOR CARRYING OUT THE INVENTION

Figure 1:
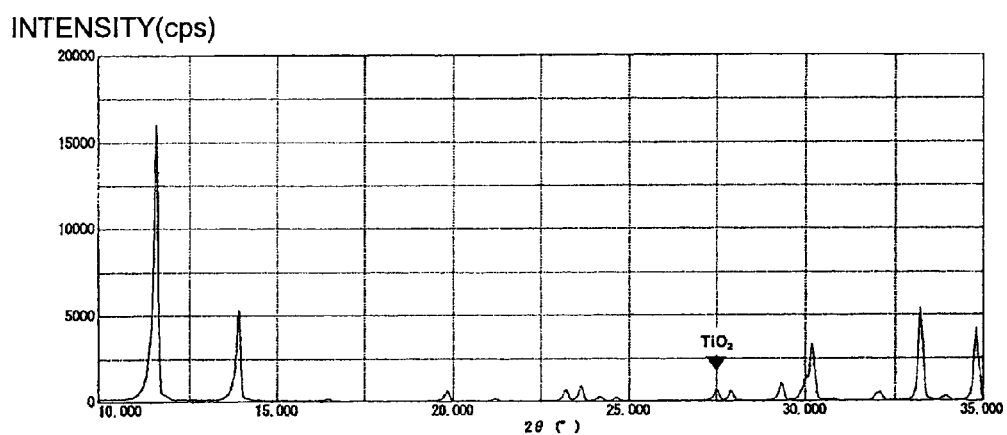
FIG. 1 is an X-ray diffraction chart of a sintered body prepared with a first step of the present invention.

The present invention provides a method of manufacturing an alkali metal titanate. The method includes at least a first step of mixing a titanium compound and an alkali metal compound to prepare a first mixture and sintering the mixture, and a second step of adding the alkali metal compound the sintered body, which is formed at the first step, to prepare a second mixture and sintering the second mixture.

The titanium compound utilized in the present invention is, for example, titanium dioxide, titanium suboxide, orthotitanic acid or its salts, metatitanic acid or its salts, titanium hydroxide, and peroxotitanic acid or its salts. A single material or a combination of at least two materials is utilized. The titanium dioxide is most preferable among them. The titanium dioxide has a good mixing and reaction with the alkali metal compound and is cheap. The alkali metal compound utilized is, for example, alkali metal carbonate, hydroxide, and oxalate. They melt at the sintering reaction. The carbonate or hydroxide is particularly preferable. These alkali metal compounds melt or decompose, and easily react at the sintering reaction with the titanium compound. They only generate carbon dioxide gas or water after decomposition without producing residual impurities in the product.

When the potassium titanate is manufactured, potassium compound such as potassium oxide, potassium carbonate, potassium hydroxide, and potassium oxalate is utilized, preferably potassium carbonate. A single or combination thereof is utilized. When the sodium titanate is manufactured, sodium compound such as sodium carbonate, sodium hydroxide, and sodium oxalate is utilized, preferably sodium carbonate. When the lithium titanate is manufactured, lithium compound such as lithium carbonate and lithium hydroxide is utilized, preferably lithium carbonate. In the present invention, the manufacturing of the potassium titanate is achieved with sintering reaction of the mixture of the titanium compound such as titanium oxide and the potassium compound such as potassium carbonate.

In the present invention, the mixing method is a conventional mixing means, a V-type blender, and a mechanical grinding means such as hammer mill, pin-mill, beads-mill and ball mill. A vibration rod mill having a rod is preferable. The vibration rod mill grinds and mixes relatively large size powders of the titanium compound and the alkali metal compound between the rods, and does not excessively grind fine powders such as the ball mill. The titanium oxide has a hydroxyl group on the surface thereof, which has a strong adhesion. The excessive grinding causes the specific surface area larger and the ground titanium oxide sticks on the mixing container. The vibration rod mill thus provides a uniform mixing compared to the other mixing methods. The resultant mixture is uniformly sintered and the sintering provides the desired composition of the alkali metal titanate.

The mixing ratio of the titanium compound and the alkali metal compound in the first step of the present invention is 0.5-10 moles, preferably 1-8 moles, of titanium atoms of the titanium raw material, and 1-3 moles, preferably 1.5-2.5 moles, of alkali metal atoms of the alkali metal compound, when the alkali metal compound is sintered to form 1 mole of the alkali metal titanate ($M_2O.nTiO_2$, where M is alkali metal). When 1 mole of the potassium tetra-titanate ($K_2O.4TiO_2$) is manufactured with sintering, titanium atoms of the titanium raw material is 3.5-4.5 moles, more preferably 3.8-4.2 moles, most preferably 4.0 moles and potassium atoms of the potassium compound is 1.8-2.2 moles, more preferably 1.9-2.1 moles, most preferably 2 moles. When 1 mole of the potassium hexa-titanate ($K_2O.6TiO_2$) is manufactured with sintering, titanium atoms of the titanium raw material is 5.5-6.6 moles, more preferably 5.8-6.2 moles and potassium atoms of the potassium compound is 1.8-2.2 moles, more preferably 1.9-2.1 moles, most preferably 2 moles.

Titanium metal powder or titanium hydride powder may be added to the mixture of the titanium compound and the alkali metal compound. Since the titanium metal powder or titanium hydride powder is oxidized into the titanium dioxide, it is thus necessary to adjust the mixing ratio by considering these powders as the titanium source. The titanium metal powder or the titanium hydride powder may be added to the mixture of the titanium compound and the alkali metal compound if necessary. In this case, 0.01-0.2 moles, more preferably 0.03-0.1 moles of titanium atom is added with respect to 1 mole of titanium atom of the titanium compound. The titanium metal powder or the titanium hydride powder burns at the same time in the reaction container during sintering and prevents temperature distribution inside the reaction container and assists the homogenous reaction.

The mixture of the titanium compound and the alkali metal compound prepared above are then sintered. The reaction container for sintering is preferably made from ceramic material such as conventional alumina. The container may have a cylindrical, a columnar, a square, and plate shape. It is preferable to interpose a sheet material to be carbonized at least between the ceramic reaction container and the mixture when the mixture is filled into the reaction container. This sheet prevents loss and penetration of the alkali metal compound into the ceramic reaction container when the alkali metal compound of the mixture melts at sintering. The sheet is paper, natural fiber, bark or thermosetting resin. They are carbonized during sintering and finally burn out without generating soft or fluent material at sintering. The paper coated with vinyl chloride is excluded, since the vinyl chloride is softened and hardly carbonized. The paper utilized includes non-bleached kraft paper, bleached kraft paper, one side glossy bleached wrapping paper, fiberboard, newsprint, fine paper, medium quality paper, recycled paper, paper books, cast-coated paper, art paper, PPC and other information paper and the like. The natural fiber utilized includes cotton, hemp, silk, and the like. The thermosetting resin utilized includes phenolic resin, epoxy resin, melamine resin and the like. The sheet material may have a sheet, a woven fabric, a non-woven fabric or a bag shape.

The sintering temperature of the first step of the present invention varies with kind and crystalline form of the alkali metal titanate. For example, the potassium titanate is obtained at the sintering temperature of 800-1300 degrees C., preferably 1000-1300 degrees C. The lithium titanate ($Li_4Ti_5O_{12}$) having a spinel crystal structure is obtained at the sintering temperature of 800-1000 degrees C., preferably 850-950 degrees C. The $Li_2TiO_3$ is obtained at the sintering temperature of 950-1450 degrees C., preferably 950-1200 degrees C. The sodium hexa-titanate is obtained at the sintering temperature of 400-900 degrees C., preferably 500-800 degrees C. The period of time of sintering is 1-10 hours, preferably 2-5 hours.

It is preferable that the resultant potassium titanate has a rod, a columnar, a cylindrical, a rectangular, a granular and/or a plate shape. The shape can be controlled with adjustment of parameters of the first step such as the sintering temperature, a cooling rate of the temperature. The higher sintering temperature provides a larger size of the potassium titanate. The temperature lower than 800 degrees C. does not provide enough reaction. The sintering temperature higher than 1300 degrees C. requires a furnace sustainable at the temperature, resulting in high cost, and makes the control of the shape difficult due to close to the melting point of the potassium titanate. It is preferable that the sintering temperature is not more than 1300 degrees C. The heating-up rate to the sintering temperature is 0.5-20 degrees C./min, preferably 1-10 degrees C./min. After sintering, the sintered body is cooled down to room temperature. The cooling-down rate is 0.5-10 degrees C./min to 300 degrees C., preferably 1-5 degrees C./min with relatively slow rate. Selection of the sintering temperature, the heating-up rate and the cooling-down rate assists grain growth of the sintered potassium titanate.

The resultant sintered body containing the alkali metal titanate and the titanium compound is mechanically ground or pulverized if necessary. The grinding or pulverization thereof is achieved with the conventional method, such as hammer mill, pin mill, beads mill, or ball mill. The ground or pulverized potassium titanate may be classified or sorted.

The resultant composition contains an atomic ratio of alkali atoms to titanium atoms (M/Ti: M is alkali metal) smaller than the ratio of the raw material prior to the sintering. This is caused by loss of evaporation of the alkali metal M from the alkali metal compound of the raw material at the sintering of the first step. When the alkali metal titanate of $M_2O.nTiO_2$ (M: alkali metal) is manufactured with the mixture of the titanium compound and the alkali metal compound with the ratio of M/Ti=2:n, the sintered body prepared with the first step has the composition containing the desired alkali metal titanate and a debris of titanium oxide, or the composition further containing a slightly different composition of the alkali metal titanate besides above the components. The composition of the sintered body is analyzed with a composition analysis, such as X-ray diffraction.

The present invention includes a second step of adding and mixing an alkali metal compound to the mixture prepared at the first step, and again sintering the mixture (the second step). The alkali metal compound to be added may be same as the alkali metal compound utilized at the first step. The mixing means of the second step may be same as that of the first step. The resultant mixture may be spray-granulated or stir-granulated.

The amount of the alkali metal compound to be added at the second step is determined with a powder X-ray diffraction. When the sintered body prepared at the first step is analyzed with the powder X-ray diffraction, the sintered body contains the desired phase of the alkali metal titanate and other impurity phase. It is explained below that the impurity phase is titanium oxide (rutile type).

The single-phase powder of an alkali metal titanate ($M_2O.nTiO_2$, M: alakli metal) and the single-phase powder of titanium oxide (rutile type) are mixed with several different compositions. The mixtures are then measured with the powder X-ray diffraction. The intensity ratio (=It/Im) is obtained from the X-ray diffraction chart obtained, where It is the strongest interference line intensity of the titanium oxide and Im is the strongest interference intensity of the alkali metal titanate. The interference line intensity can be obtained with height of the interference line or the area thereof. A relation between the mixing ratio (=weight of titanium oxide/weight of alkali metal titanate) and the measured intensity ratio (=It/Im) is obtained. The relation may also be plotted (a first procedure). The sintered bodies prepared in the first step are measured with the X-ray diffraction. From the X-ray diffraction chart of each sintered body, the respective intensity ratios (=It/Im), where It and Im are the strongest interference line intensity of the titanium oxide and the alkali metal titanate, are determined (a second procedure). The each value of the intensity ratios determined with the second procedure is referred to the relation obtained with the first procedure to deduce the composition ratio of the titanium oxide to the alkali metal titanate of the sintered body prepared at the first step (a third procedure). From comparison of the composition ratio of the sintered body with that of the mixture of the first procedure, the amount of addition of the alkali metal compound to be mixed at the second step is adjusted. The amount of the residual titanium oxide obtained at the sintering of the first step is actually determined from the composition ratio of the third procedure. The amount of the alkali metal compound to change the residual titanium oxide into the alkali metal titanate ($M_2O.nTiO_2$) is calculated so that the ratio of the residual titanium to the alkali metal is n/2 in molar ratio.

When the impurity phase is not the titanium oxide (rutile type) and the alkali metal titanate is different from the desired composition, the amount of the alkali metal compound is determined with the same method described above. In this case, the procedures are same as the method described above. The single-phase powder of the desired alkali metal titanate and the single-phase powder of the impurity phase alkali metal titanate are mixed together to have different composition ratios. The mixtures are each measured with the X-ray diffraction. The intensity ratio of the strongest interference lines is obtained from the respective measured X-ray diffraction charts. The relation between the composition ratio and the intensity ratio is obtained (the first procedure). The sintered bodies prepared in the first step are measured with the X-ray diffraction. From the X-ray diffraction chart of each sintered body, the respective intensity ratios (=It/Im), where It and Im are the strongest interference line intensity of the impurity phase alkali metal titanate and the desired alkali metal titanate, are determined (the second procedure). The each value of the intensity ratios determined with the second procedure is referred to the relation obtained with the first procedure to deduce the composition ratio of the impurity phase alkali metal titanate to the desired alkali metal titanate prepared at the first step (the third procedure). From comparison of the composition ratio of the sintered body with that of the mixture of the first procedure, the amount of addition of the alkali metal compound to be mixed at the second step is adjusted. The amount of the residual impurity phase alkali metal titanate ($M_2O \cdot mTiO_2$) obtained at the sintering of the first step is determined from the mixing ratio determined at the third procedure. The amount of the alkali metal compound necessary to change the impurity phase alkali metal titanate into the desired alkali metal titanate ($M_2O \cdot nTiO_2$) is calculated so that the molar ratio of Ti/M is to be 2:n, since the molar ratio of Ti/M of the impurity phase alkali metal titanate is 2:m.

When the strongest interference lines of the desired alkali metal titanate and the impurity phase are overlapped, the strongest interference lines not overlapping one another are used. The first procedure and the second procedure may be reversed in order. When a number of impurity phase are present, the amount of the alkali metal compound is determined with the method described above with respect to the respective impurity phases. When the impurity phases are the titanium oxide and the undesired alkali metal titanate, the amount of the alkali metal compound (A) can be calculated from the X-ray diffraction chart of the desired alkali metal titanate and the titanium oxide with the method described above. The amount of the alkali metal compound (B) can be calculated from the X-ray diffraction chart of the desired alkali metal titanate and the impurity phase alkali metal titanate. The total amount (A+B) of the alkali metal compound is the amount to be added at the second step.

The sintering temperature at the second step is at least 800 degrees C. when the alkali metal compound is the potassium compound. The temperature below 800 degrees C. does not cause the reaction between the potassium titanate and the titanium compound. The sintering temperature of the second step is preferably at most 1000 degrees C. in order to keep the grain shape obtained at the first step. The sintering can be achieved in atmosphere or oxidizing atmosphere.

It is preferable that the sintering temperature of the second step is lower than that of the first step to avoid evaporation loss of the alkali metal. This sintering assures the high purity alkali metal titanate while keeping the powder shape obtained at the first step.

EXAMPLE

Embodiments of the present invention are explained below but they are only exemplary and not limited thereto.

Example 1

550 grams of the titanium oxide powder in aggregate form with an average grain size of 0.8 mm, 166 grams of the potassium carbonate powder, 28 grams of the titanium powder, and 55 grams of sawdust were packed in the small size vibration mill (Product of CHUO KAKOHKI CO., LTD.) including cylindrical rod media. 4 grams of methanol was added to the mixture and the resultant mixture was then ground for 15 minutes at 80 degrees C. inside of the mill with an amplitude of 8 mm and a frequency of 1000 cycles/min. 500 grams of the ground mixture was packed into the ceramic reaction container having an upper opening, a craft paper being disposed on the bottom of the ceramic container. The container was then set in an electric furnace and was heated to 1050 degrees C. and sintered at 1000-1100 degrees C. for 5.5 hours. The container was cooled down to room temperature with a period of 13 hours and the sintered body S was then pulverized with a pulverizer (the first step). The ground sintered body had mainly a rod, a columnar or a cylindrical shape. The average minor axis thereof was about 3 μm and the average length was about 6 μm. The average minor axis and the average length were determined with image analysis of scanning electron microscopy of about 200 particles.

FIG. 1 shows the X-ray diffraction chart of the sintered body S. The diffraction chart showed that the sintered body contained the potassium hexa-titanate crystalline phase and the rutile type titanium oxide phase.

The relation between the mixing ratio of the titanium oxide to the potassium hexa-titanate and the intensity ratio (Ir/Im, where Ir is the strongest interference line peak height of the titanium oxide, and Im is the strongest interference line peak height of the potassium hexa-titanate in the X-ray chart) was determined with the following manner.

Potassium hexa-titanate (single-phase) powder and the single crystal titanium oxide powder (100% rutile) were first prepared. Several mixtures (mixing ratio of titanium oxide single crystal powder/potassium hexa-titanate powder=0.5, 1, 2, 3, 4, 5 in weight ratio) were prepared with the powders. These mixtures were then analyzed with the powder X-ray diffraction. The peak height (Ir) of the strongest interference line (plane index: 110) of the rutile type crystal titanium oxide and the peak height (Im) of the strongest interference line (plane index: 200) of the potassium hexa-titanate powder were determined from the X-ray diffraction chart, and the respective intensity ratios (Ir/Im) were obtained. The composition ratio (percent by weight of single crystal titanium oxide powder/potassium hexa-titanate powder) and the intensity ratio (Ir/Im) was plotted and obtained the following relation (Equation 1) with a least square means method.

$$\text{Intensity Ratio} = 0.0051 \times [\text{composition ratio}](\%) + 0.0003$$

The powder X-ray diffraction measurement was made with the following condition.

<Condition of X-Ray Diffraction Measurement>
diffraction apparatus: RAD-1C (Product of Rigaku Corporation)
X-ray tube: Cu
tube voltage and current: 40 KV, 30 mA
slit: DS-SS 1 degree, RS 0.15 mm
monochromator: graphite
measurement interval: 0.002 degree
counter: constant time counter The intensity ratio (Ir/Im) of the sintered body S prepared at the first step was determined from the X-ray diffraction chart of FIG. 1. Ir is the peak height of the strongest interference line (plane index: 110) of the rutile type crystalline titanium oxide and Im is the peak height of the strongest interference line (plane index: 200) of the potassium hexa-titanate. The obtained intensity ratio was applied to Equation 1 to estimate the composition ratio between the titanium oxide and the potassium hexa-titanate. It was found that the weight ratio of the titanium oxide to the sintered body was 7.5%.

This implies that the ratio of M/Ti, where M is alkali metal, decreased with sintering in the first step, in other words, the alkali metal evaporated in the first step.

Figure 2:
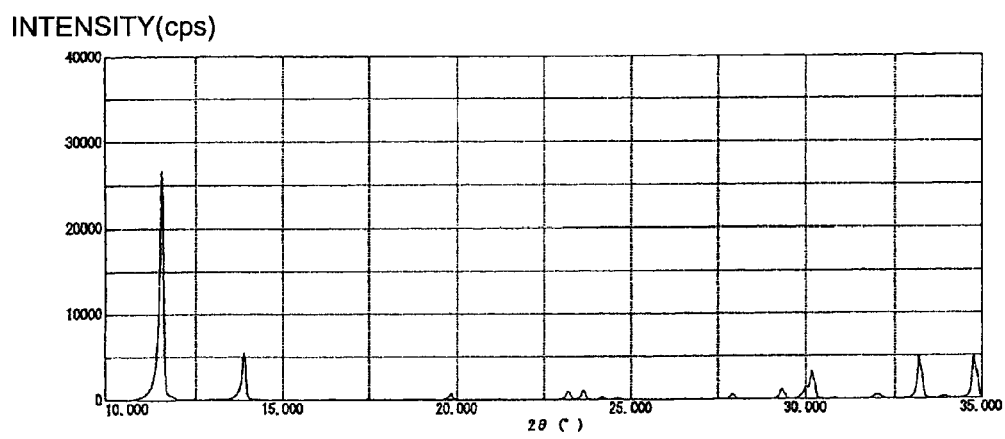
FIG. 2 is an X-ray diffraction chart of a sintered body prepared with a second step of the present invention.

In the present invention, 200 grams of the sintered body S prepared in the first step and 4.3 grams (molar ratio of potassium carbonate/titanium oxide=1/6) of the potassium carbonate powder were stir-mixed, where 4.3 grams of the potassium carbonate powder correspond to 15 grams of the titanium oxide, which is 7.5% of 200 grams of the sintered body S. The resultant mixture was then sintered at 900 degrees C. for 2 hours. The sintered body was cooled down to room temperature (the second step) and analyzed with the powder X-ray diffraction. FIG. 2 shows the X-ray diffraction chart. The diffraction chart of FIG. 2 apparently shows that the sintered body is the single-phase potassium hexa-titanate. The potassium hexa-titanate had a rod, a columnar, or a cylindrical shape, which shape was the same as that of the sintered body prepared in the first step.

According to the present invention, when the first step does not provide the desired single-phase potassium titanate, the addition of the suitable amount of the alkali metal compound at the second step can achieve obtaining the desired single-phase potassium titanate at the sintering (the second step). The adjustment of the sintering temperature at the first step can control the shape and size of the potassium titanate particles. When the sintering at the second step is achieved at a temperature lower than the sintering temperature of the first step, the single-phase potassium titanate having the desired composition is obtained while the particle shape remains with reaction of the residual titanium oxide.

Example 2

10 kg of the sintered body S prepared at the first step, 0.216 kg of the potassium carbonate, the amount of which corresponds to the necessary amount to change 0.75 kg of the titanium oxide, which corresponds to 7.5% of 10 kg of the sintered body, to the potassium hexa-titanate to achieve the molar ratio of 1/6 for the potassium carbonate to the titanium oxide, 0.2 kg of ethyl cellulose binder (WN405: Product of Chukyo Yushi Co., Ltd.), and 0.1 kg of special polycarboxylic acid ammonium salt (KE-511: Product of Goo Chemical Co., Ltd.) as an additive agent were dispersed into 10 kg of water while stirring to form a slurry of the sintered body S. The slurry was spray-dried with a disk type dryer. The condition of the spray-drying was 10,000 rpm of an atomizer at a temperature of 250 degrees C. The spray-dried powder was heat treated at 900 degrees C. for 2 hours in the electrical furnace (the second step).

The resultant powder was the potassium titanate having the hollow body powder having the rod, the columnar, or the cylindrical shape and the size prepared at the first step. The size (outer diameter) of the hollow body particles was 50 to 100 μm. The powder obtained at the second step analyzed with the X-ray diffraction was the single-phase potassium hexa-titanate. The fracture strength of the hollow body powders was measured with a digital hardness meter (KHT-40N Type: Product of Fujiwara Scientific Co., Ltd.) and the measured value was 7.8 kg/cm$^2$.

Comparative Example 1

The comparative example was the same as that of Example 2 except without addition of 0.216 kg of the potassium carbonate. The X-ray diffraction showed that the hollow body particles had the crystalline phase of the potassium hexa-titanate and the rutile type titanium oxide. The obtained hollow body particles had a size (outer diameter) of 50 to 100 μm and the fracture strength of 3.8 kg/cm$^2$.

INDUSTRIAL APPLICABILITY

The potassium titanate with the hollow body powder of the present invention has high strength, so that the particles thereof are not separated (dispersed) one another when they are mixed with other materials. The hollow body powder formed with the potassium titanate particles of the present invention is thus suitable for friction material since they have high porosity.

The invention claimed is:

1. A method of manufacturing an alkali metal titanate, the method comprising:
    a first step of mixing a titanium compound and a first amount of a first alkali metal compound to prepare a first mixture and sintering the first mixture to form a sintered body; and
    a second step of adding a second amount of a second alkali metal compound, which is the same as the first alkali metal compound, to the sintered body, which is formed at the first step, to prepare a second mixture and sintering the second mixture.

2. A method of manufacturing an alkali metal titanate, the method comprising:
    a first step of mixing a titanium compound and a first amount of a first alkali metal compound to prepare a first mixture and sintering the first mixture to form a sintered body; and
    a second step of adding a second amount of a second alkali metal compound, which is the same as the first alkali metal compound, to the sintered body, which is formed at the first step, to prepare a second mixture, dispersing the second mixture in a solvent to form a slurry, spray-drying the slurry to form a powder, and sintering the powder.

3. The method as claimed in claim 1, wherein when the sintered body formed at the first step contains the alkali metal titanate and a titanium oxide, the method further comprising:
    determining, by a first procedure, a relation between a composition ratio of the alkali metal titanate to the titanium oxide and an intensity ratio of the strongest interference line of X-ray diffraction of the alkali metal titanate to the titanium oxide;
    determining, by a second procedure, the intensity ratio of the strongest interference line of X-ray diffraction of the alkali metal titanate to the titanium oxide formed at the first step;
    determining, by a third procedure, the composition ratio of the alkali metal titanate to the titanium oxide formed at the first step by applying the intensity ratio determined at the second procedure to the relation determined at the first procedure,
    wherein the second amount of the second alkali metal compound to be added at the second step is adjusted in response to the composition ratio determined at the third procedure.

4. The method as claimed in claim 1, wherein the titanium compound is titanium oxide and the first alkali metal compound is a potassium compound.

5. The method as claimed in claim 4, in which the first mixture is sintered at a sintering temperature in the first step and the second mixture is sintered at a sintering temperature in the second step, wherein the sintering temperature of the first step is higher than the sintering temperature of the second step.

6. The method as claimed in claim 4, wherein the sintering temperature of the first step is 1000-1300 degrees C. and the sintering temperature of the second step is 800-1000 degrees C.

7. The method as claimed in claim 4, wherein the alkali metal titanate is potassium hexa-titanate having a rod, a columnar, a cylindrical, a rectangular and/or a plate shape.

8. The method as claimed in claim 2, wherein the second amount of the second alkali metal compound to be added in the second step is adjusted in response to a composition ratio of the alkali metal titanate to other compounds formed at the first step in order to obtain a single-phase alkali metal titanate with sintering at the second step.

9. The method as claimed in claim 2, wherein when the sintered body formed at the first step contains the alkali metal titanate and a titanium oxide, the method further comprising:
  determining, by a first procedure, a relation between a composition ratio of the alkali metal titanate to the titanium oxide and an intensity ratio of the strongest interference line of X-ray diffraction of the alkali metal titanate to the titanium oxide;
  determining, by a second procedure, the intensity ratio of the strongest interference line of X-ray diffraction of the alkali metal titanate to the titanium oxide formed at the first step;
  determining, by a third procedure, the composition ratio of the alkali metal titanate to the titanium oxide formed at the first step by applying the intensity ratio determined at the second procedure to the relation determined at the first procedure,
  wherein the second amount of the second alkali metal compound to be added at the second step is adjusted in response to the composition ratio determined at the third procedure.

10. The method as claimed in claim 2, wherein the titanium compound is titanium oxide and the first alkali metal compound is a potassium compound.

11. The method as claimed in claim 10, in which the first mixture is sintered at a sintering temperature in the first step and the second mixture is sintered at a sintering temperature in the second step, wherein the sintering temperature of the first step is higher than the sintering temperature of the second step.

12. The method as claimed in claim 10, wherein the sintering temperature of the first step is 1000-1300 degrees C. and the sintering temperature of the second step is 800-1000 degrees C.

13. The method as claimed in claim 10, wherein the alkali metal titanate is potassium hexa-titanate having a rod, a columnar, a cylindrical, a rectangular and/or a plate shape.

* * * * *